US005204513A

United States Patent [19]

Steele

[11] Patent Number: 5,204,513
[45] Date of Patent: Apr. 20, 1993

[54] DECODER FOR MAGNETIC STRIPE RECORDING

[75] Inventor: George R. Steele, Long Beach, Calif.

[73] Assignee: American Magnetics Corporation, Carson, Calif.

[21] Appl. No.: 591,739

[22] Filed: Oct. 2, 1990

[51] Int. Cl.⁵ .................... G06K 7/08; G06K 19/06
[52] U.S. Cl. .................................. 235/449; 235/450; 235/493
[58] Field of Search ............... 235/436, 449, 482, 450, 235/493; 360/2, 42, 88

[56] References Cited

U.S. PATENT DOCUMENTS

| | | | |
|---|---|---|---|
| 3,581,297 | 5/1971 | Behr et al. | 360/40 |
| 4,053,736 | 10/1977 | Banka et al. | 360/2 |
| 4,053,936 | 10/1977 | Fouts, Jr. | 360/62 |
| 4,088,879 | 5/1978 | Banka et al. | 235/449 |
| 4,112,381 | 9/1978 | Mortensen et al. | 328/150 |
| 4,141,494 | 2/1979 | Fisher | 235/449 |
| 4,143,356 | 3/1979 | Nally | 235/449 |
| 4,346,290 | 8/1982 | Rossi | 235/436 |
| 4,626,670 | 12/1986 | Miller | 235/436 |
| 4,628,195 | 12/1986 | Baus | 235/448 |
| 4,634,848 | 1/1987 | Shinohara et al. | 235/439 |
| 5,019,696 | 5/1991 | Chang et al. | 235/436 |

Primary Examiner—Eugene R. Laroche
Assistant Examiner—Tan Nguyen
Attorney, Agent, or Firm—Herbert M. Shapiro

[57] ABSTRACT

A magnetic stripe decoder includes an amplitude discrimination circuit to remove noise due to glitches. The use of amplitude discrimination rather than a filter, which is in common use today, permits a single decoder circuit to decode data over a wide range of frequencies including the standards 75 BPI and 210 BPI. In the absence of such an amplitude discriminator, two different decoders, one for 75 BPI and one for 210 BPI are necessary.

4 Claims, 4 Drawing Sheets

DECODER FOR MAGNETIC STRIPE RECORDING

FIELD OF THE INVENTION

This invention relates to the reading of magnetic indicia recorded on a magnetic stripe, and more particularly to the reading of such indicia recorded on a magnetic stripe of a credit card and the like.

BACKGROUND OF THE INVENTION

It is well known that a credit card includes a magnetic stripe which has encoded on it various information identifying the individual to whom the card is issued, the issuing bank, and other related information. Information is stored on such a stripe in a "Biphase" mark coding technique in "cells" defined by a leading and an associated trailing magnetic flux reversal, the spacing between which defines the period or length of the cell. A binary one is defined by an additional flux reversal in the middle of a cell; a binary zero is defined by the absence of an additional flux reversal. Thus, the information bits (data) on a magnetic stripe are represented by a sequence of binary ones and zeros so defined.

In most applications, a card with a magnetic stripe with recorded data is passed by a magnetic read head where each magnetic flux reversal is converted into an electrical signal. The standard densities at which the bits of data occur are 75 and 210 bits per inch (BPI). The electronic circuitry responsive to the signals detected by the read head are designed for either 75 or 210 BPI data densities but not both. The reason that such circuitry is not responsive to signals at both signal densities is that a certain percentage of magnetic stripe cards in circulation contain defects which produce spurious read head currents which lead to erroneous signals. Further, frequently, scratches occur on the magnetic stripe through contact with, for example, keys. These defects and scratches not only produce spurious signals but those spurious signals seem to occur at about the 210 BPI rate because they tend to occur close together separated by distances small compared to the cell size.

In order to avoid errors due to such defects and scratches, existing magnetic stripe decoders at 75 BPI densities include a filter circuit which suppresses responses to signals which occur above 75 BPI. Decoders adapted for operation at 210 BPI have less of a need for such filters. Errors do occur but less frequently at 210 BPI. Thus two different types of decoders for magnetic stripe sensing are available for operation at two distinct bit densities but not both.

It would, of course, be advantageous to produce a single decoder which could respond to any bit density of from about 75 BPI to 210 BPI and still avoid spurious signals.

BRIEF DESCRIPTION OF AN ILLUSTRATIVE EMBODIMENT OF THE INVENTION

In accordance with the principles of this invention, the filter circuit present in commercial magnetic stripe decoders for 75 BPI densities is absent. It has been recognized that spurious signals produced by defects and by scratches are of relatively low amplitude compared to signals produced by encoded binary bits. Based on that recognition, an amplitude discriminator circuit is added to the decoder to discriminate against any signal of amplitude less than a preset level chosen to higher than that produced by defects and scratches. The resulting decoder is responsive to bit densities of from 75 BPI to 210 BPI (or greater) and removes spurious signals. The resulting economies of scale produce significant cost reduction. Moreover, a further cost reduction is achieved by replacing the relatively expensive filter circuit with an inexpensive integrated single chip circuit for discriminating against spurious signals. Error free operation is permitted over the entire range of acceptable frequency.

DETAILED DESCRIPTION OF AN ILLUSTRATIVE EMBODIMENT OF THIS INVENTION

Figure 1:
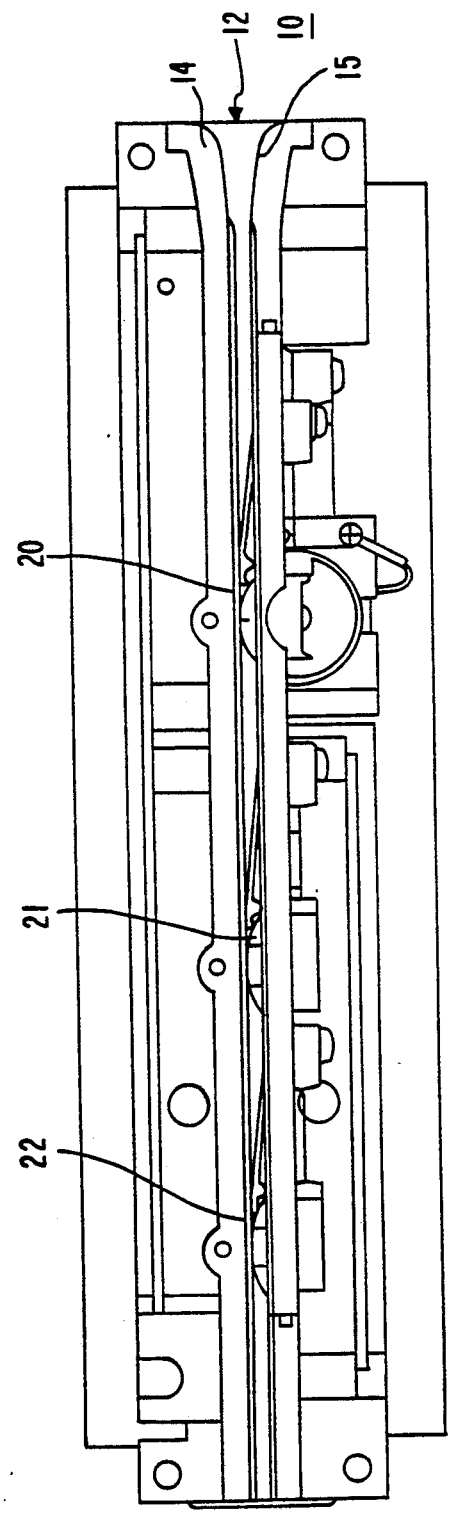
FIGS. 1 and 2 are top and end views of a commercially available magnetic stripe reader.

FIG. 1 shows a top view of a credit card reader (decoder) 10. The reader includes a slot 12 defined between side walls 14 and 15. A card or magnetic stripe media to be read by the unit is inserted into slot 12 and moved between the side walls from right to left as viewed.

Figure 2:
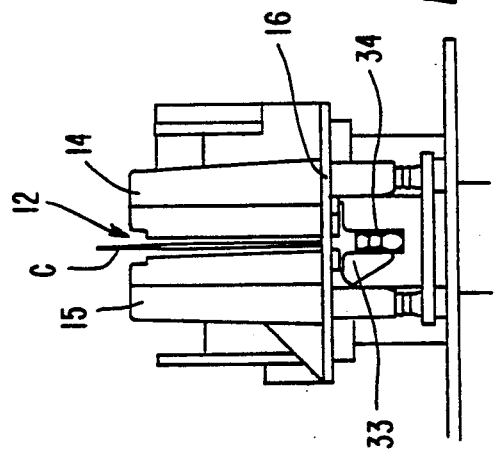

FIG. 2 shows an end view of reader 10 showing a bearing surface at the bottom of the slot. The bearing surface is defined by the portion of plate 16 exposed between side walls 14 and 15. A credit card C properly seated against the bearing surface has its (multi-track) magnetic strip defined in a vertical plane such that write head 20 and read heads 21 and 22 contact the magnetic stripe consecutively as the card is moved.

Figure 3:
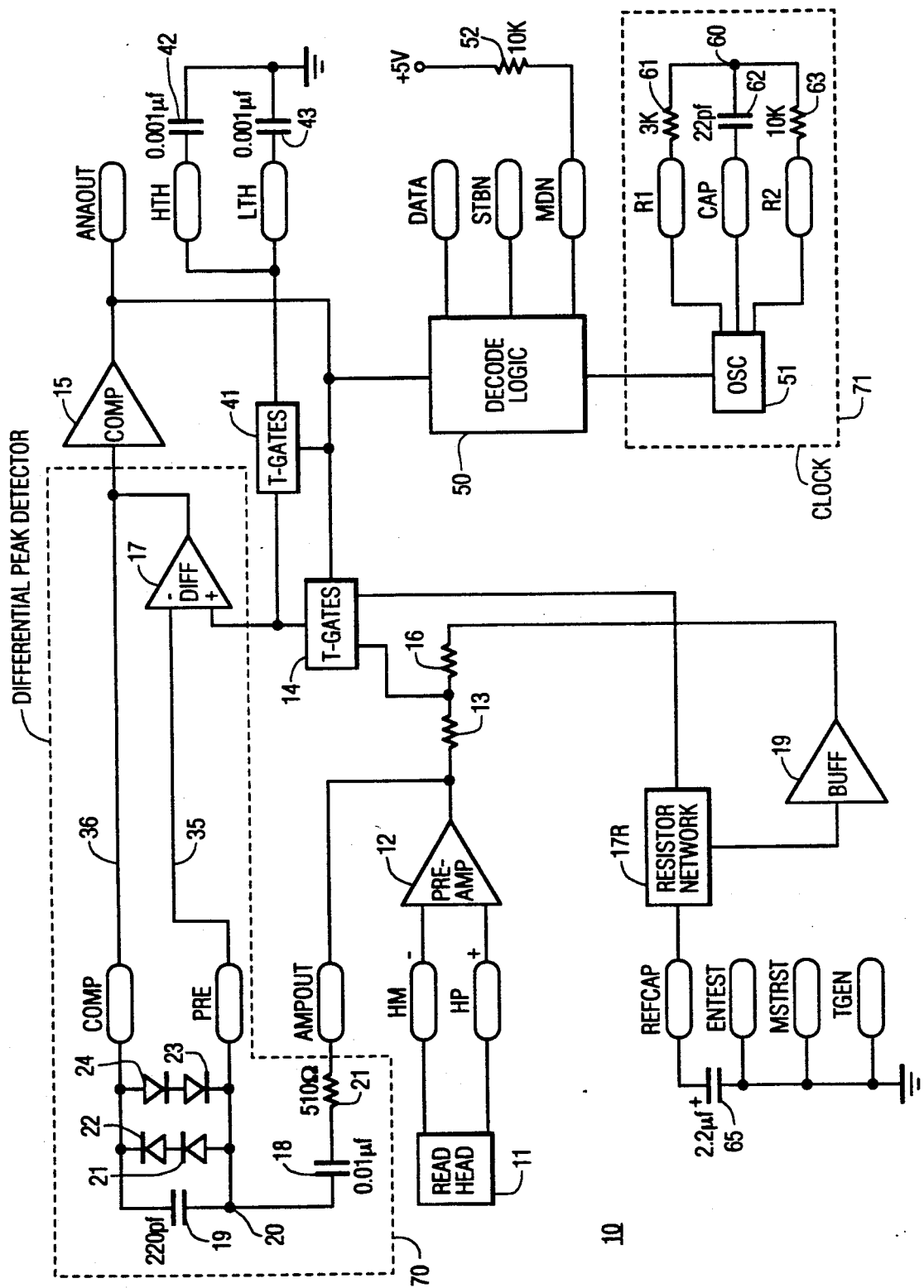
FIGS. 3 and 4 are block diagrams of the analog and digital portions of the electronic circuit for the reader of FIGS. 1 and 2 in accordance with the principles of this invention.

The reader of FIG. 1, along with its component mechanical organization, is well understood in the art and is not discussed in detail. The present invention is directed at the electronic circuitry for such a reader which permits reading essentially free of spurious signals over the data density range of from about 65 BPI to about 430 BPI. FIG. 3 shows a block diagram of the analog portion of the circuitry of the reader of FIG. 1. The circuit includes a number of pin connections identified and defined as follows:

| | |
|---|---|
| COMP | Comparator Input |
| PRE | Differentiator Input |
| AMPOUT | Preamplifier Output |
| HM | Head Input (Minus) |
| HP | Head Input (Plus) |
| REFCAP | Reference Capacitor |
| ENTEST | Enable Test Input |
| MSTRST | Master Reset Control |
| TGEN | Transmission Gate Enable Control |
| ANAOUT | Analog Output |
| HTH | High Threshold |
| LTH | Low Threshold |
| DATA | Data |
| STBN | Strobe |
| MDN | Media Detect |
| R1 | Oscillator Resistor One |
| CAP | Oscillator Capacitor |
| R2 | Oscillator Resistor Two |

In the circuit of FIG. 3, a coil of a read head 11 is connected to pins HM and HP. First and second inputs to a preamplifier 12 are also connected to those pins. The output of amplifier 12 is connected via resistor 13 to an input to T-gate circuit 14. The output of amplifier 12 also is connected to the AMPOUT pin. The input to comparator 15 is connected to the COMP pin. The input to differential amplifier 17 is connected to the PRE pin. The AMPOUT pin is connected to the COMP pin via capacitor 18 and 19, the node 20 therebetween being connected to pin PRE. Diode pairs 21 and 22 and 23 and 24 are across capacitor 19. The output of T-gates 14 is connected to a second input to amplifier 17. The output of amplifier 17 also is connected to the input to comparator 15.

An output of T-gate 14 is connected to an input to T-gates 41. Also, inputs of T-gates 41 and 14 are connected to the output of comparator circuit 15. An output of T-gate 41 is connected to the high threshold and low threshold pins (HTH and LTH) respectively. The HTH and LTH pins are connected to ground via capacitors 42 and 43 respectively.

An output of comparator circuit 15 also is connected to the input to decode logic circuit 50. The inputs of circuit 50 are also connected to the output of oscillator 51. The data, strobe, and MDN outputs of circuit 50 are connected to pins so designated, pin MDN being an open collector output pulled-up via a resistor 52. The outputs of oscillator 51 are connected to the R1, CAP, and R2 pins, all connected to node 60, via resistor 61, capacitor 62, and resistor 63 respectively, the values of which determine the proper operating frequency.

An input to resistor network 17R is connected to pin REFCAP, which is connected to ground via a capacitor 65 as shown. PINS, ENTEST, MSTRST, and TGEN are for production testing and are connected to ground in operation.

Differential amplifier 17 along with associated components encompassed by dashed block 70 constitutes a differential peak detector. Oscillator 51 plus associated components encompassed by dashed block 71 constitutes a master clocking oscillator.

The circuitry of the reader (defined in an ASIC) includes both linear and digital elements. Three operational amplifiers, four transmission gates, one comparator, and voltage reference resistors of FIG. 3 comprise the linear elements.

The reference resistors and buffer amplifier provide a reference voltage (pseudo ground) and initial dead band thresholds for the amplifiers. The pseudo ground voltage is about half of the buffer amplifier output voltage swing for the 5 volt power supply. This makes the amplifier outputs operate in a class AB mode with the single supply and satisfies the requirement of symmetrical threshold points for the comparator circuit (the final analog output stage).

For the illustrative circuit, the signal flows from the read head (11) through the pre-amplifier (12), differentiator amplifier (17), and out the comparator circuit (15). The pre-amplifier provides a simple gain boost to the signal from the magnetic read head. The gain resistors (13 and 16) need not be absolutely accurate, but their ratio, being determinative of the amplifier gain, must always be within +/−5%. The differentiator is used as a peak detector. The differentiator output swings from one limit to the other as the input voltage changes direction. The diodes 21, 22, 23, and 24 set the swing limit and ensure high gain while keeping the output from saturation. The capacitors provide high and low frequency gain behavior for the differentiator circuit.

The differentiator amplifier (17) has two positive inputs; one connected to a dead band threshold above pseudo ground, the other connected to a dead band threshold below pseudo ground. For inputs between the threshold points, the differentiator amplifier output is high impendance. In a standby condition (no media), the thresholds are fixed through a set of transmission gates (14). Once several flux reversals (approximately 5) are counted by the decode logic (50), the fixed threshold transmission gates are turned off and another set of transmission gates (41) are turned on. This other set (41) supplies dynamic thresholds, stored on capacitors 42 and 43, that are a dynamic fraction (about 30%) of the preamplifier output determined by resistors 13 and 16.

The intent of the thresholds is to block spurious noises (glitches) picked up by the read head, which can be great enough to cause false output transitions because of the high gain, needed for responsive differentiation, in the differentiator amplifier. As long as the preamp output is below the dynamic threshold the differential amplifier output is high impendence (off).

The output comparator circuit (15) has positive feedback for hysteresis. The positive hysteresis assures clean switching once the differential amplifier output exceeds the hystersis threshold. This threshold further reduces system noise from generating false outputs. The feedback also sets symmetrical threshold points for comparator switching. The differential amplifier thus can be seen to operate as a differential peak detector or amplitude differentiator as noted above.

The comparator circuit output is connected to the digital portion of the ASIC through a digital buffer. From this point, the digital circuit receives level transitions that are clean ratiometric representations of the original indicia read from the magnetic stripe.

Figure 4:
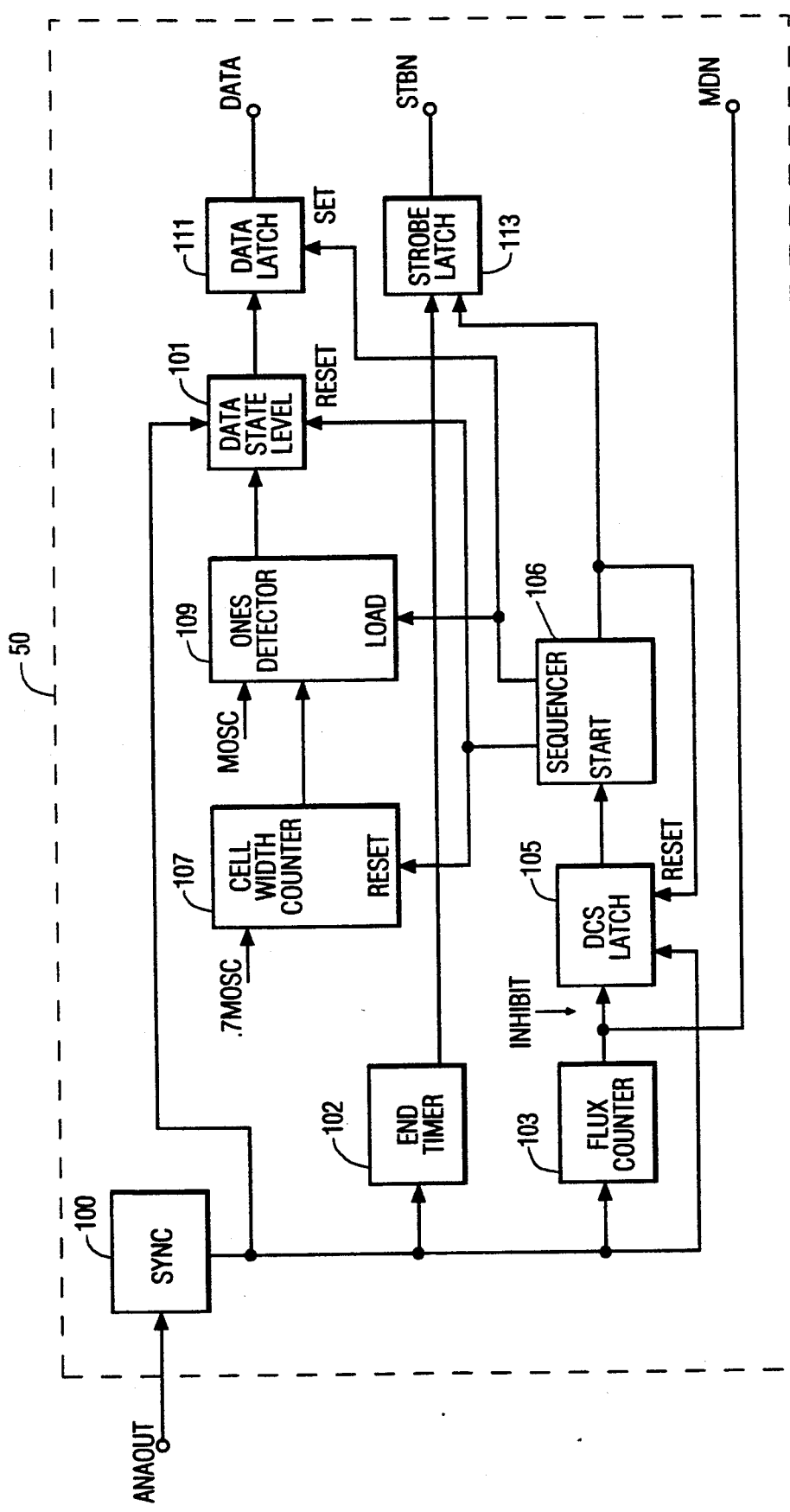

The decode logic block 50 of FIG. 3 constitutes the digital portion of the circuitry. The digital circuit is represented in FIG. 4. The digital elements comprise the equivalent of about 600 to 700 standard gates.

The digital circuit is designed with the assumption that there are two types of data cells: "ZERO" data cells and "ONE: data cells. A "ONE" data cell has a level transition (ideally) half way between the transitions that mark the "ZERO" data cell boundaries. The circuit uses the width of the previous data cell to determine a "Decision Point" within the current data cell. If there is a level transition before the decision point, then the cell data is a "ONE"; otherwise, the cell data is a "ZERO". This process continues for all of the data cells of the magnetic media.

The algorithm for the operation of the circuit of FIGS. 3 and 4 is as follows: If the data cell contains a binary "zero", establish a new decision point for the next data cells based on the last data cell period. If the data cell contains a binary "one", wait for the next flux reversal (cell boundary) to establish the new decision point. Next, output the data bit level and output the data bit available strobe. Continue the process of looking for flux reversals and outputting data bits and strobes based on the coincidence of flux changes.

The ANAOUT output from the analog circuit of FIG. 3 is connected to the input of a synchronization circuit 100. The output of synchronization circuit 100 is connected to the inputs of a data state level circuit 101, to an End Timer 102, and to Flux Counter 103. The output of Timer 102 is connected to the input of strobe latch 113. The output of flux counter circuit 103 is connected to the input of latch 105 and to the MDN output. The output of latch 105 is connected to an input (start) of sequencer 106.

A first output of sequencer 106 is connected to the reset input of cell width counter 107 and to the reset input of data state level circuit 101. A second output of sequencer 106 is connected to an input (load) of "ONES" Detector circuit 109. The output of Data state level circuit 101 is connected to an input of data latch 111. The second output of sequencer 106 is also connected to the set input of data latch 111. The output of data latch 111 is connected to the DATA pin of FIG. 3.

The third output of sequencer 106 is connected to an input to strobe latch 113 and to the reset input to DCS latch 105. The output of strobe latch 11 is connected to the STBN pin of FIG. 3.

A master oscillator 51, shown in FIG. 3 supplies 0.7 MOSC and 1.0 MOSC pulses to inputs to cell width counter 107 and "ONES" counter 109 respectively. The cell width counter (107) in FIG. 4 contains a count which is 0.7 of the period of the bit cell and is loaded into "ONES" detector 109 because that is the decision point for the determination as to whether or not a "ONES" flux reversal has occurred.

The "SYNC" circuit generates a narrow pulse for every level transition from the analog circuit. This supplies the digital circuit with positive pulses of a known width. (The duration of the level between transitions from the analog circuit is unknown and can vary greatly from time to time).

A latch 105 is used to enable the beginning of a Data Cell Sequence (DCS). The latch is inhibited by the LOW signal on the SET input. A DCS is begun by a LOW pulse at the SET input. A DCS is ended by a LOW on the RESET input. A DCS performs the following sequence via sequencer 106: loads the ones detector with the count for the Decision Point from the cell width counter based on the previous data cell period; clocks the "Data State Level" decoded from the previous data cell into the data out "Flip-Flop"; resets the "data state level" holding latch so that it is ready for data to be decoded for the next data cell; resets the cell width counter so that it can accumulate the Decision Point count for the next (beginning) data cell; resets the DCS latch; and finally, clocks the data strobe output latch to signal the new data level at the data output.

An AND gate is the decision point gate for the digital circuit.

The Master Oscillator is a positive feedback design that forces the circuit into oscillation. The frequency does not need to be stable over the long term, but must always be in the specified band over the temperature range and process tolerances using 5% tolerance resistors and +/−20% tolerance capacitors determined by a capacitor and resistor network in a well understood manner.

The magnetic media has leading "ZERO" data cells. Usually the first several data cells are corrupted because of the data encoding process or the physical nature of the edge of the media substrate. These corrupted data cells are ignored. The flux counter (103) counts 10 flux reversals (9 data cells) before lifting the inhibit signal to the DCS latch. The inhibit signal also provides other functions: it holds the cell width counter in a proper count so a leading zero can be accumulated; it resets the strobe latch so that no false strobes will occur; it inhibits its own clock input so that the counter does not advance once it has counted the initial leading zeros; it is used to develop the media detect signal because the signal remains in a fixed state from the detection of the first good leading zero until approximately 7 milliseconds after the last flux reversal is detected. Also, it holds the data output flip-flop in a reset state so that the data output is low at all times when there is no media.

The DCS is performed primarily by the sequencer circuits 106. However, it also provides rate generator function (not shown) between the DCS periods. The rate generator (in 106) produces 7 clocking pulses to the cell width counters for every 10 clocking pulses sent to the ones detector (0.7 MOSC).

When no flux reversals have occurred for 20480 master clock periods, the end timer will reset the flux counter (103) thereby resetting most of the circuit for the next card read cycle.

The ENTEST input pin must be held LOW for a proper circuit operation. The MSTRST input may be used as a master reset control for the decoding circuit. MSTRST should be LOW or open for normal operation. If the reset input is high, operation is stopped, the DATA output is forced LOW, and MDN and STBN are forced HIGH.

Figure 5:
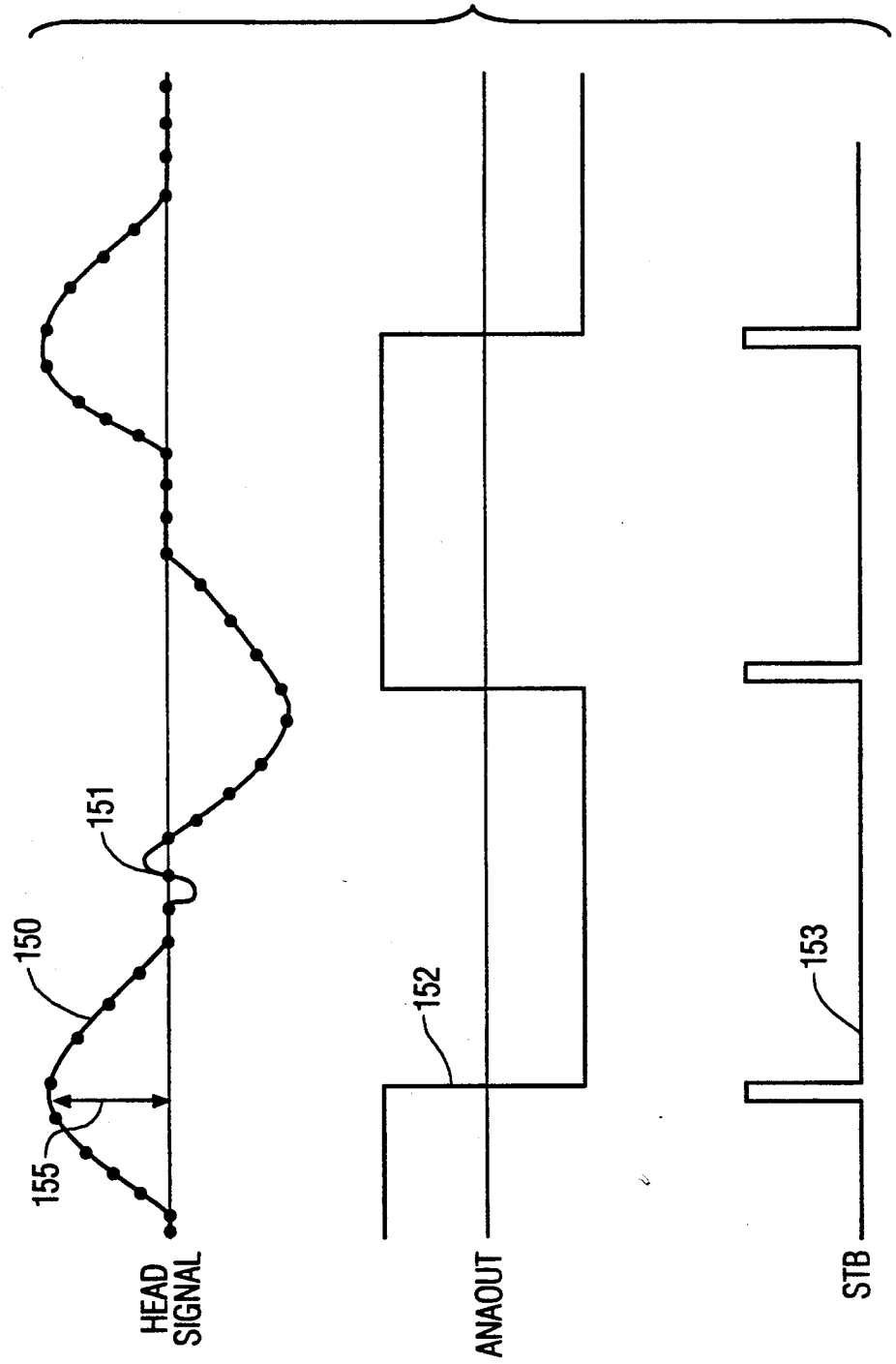
FIG. 5 is a pulse diagram of the operation of the circuit of FIG. 2.

FIG. 5 shows a curve 150 depicting the signal at the decoding head of FIG. 1. The curve includes a glitch 151 at the zero transition point. The figure also shows the output signal 152 at the ANAOUT pin of FIG. 3 and the strobe signal 153 at pin STBN of FIG. 3 to show the timing relationship between the various signals. The T-gates of FIG. 3 are operative to store approximately one third the signal amplitude 155 on capacitors so that the differential amplifier will not respond to any signal less than the signal stores in the capacitors minus some drift due to leakage.

The temporal decoding circuit of FIGS. 3 and 4 relies on using the duration of the previous bit length ("cell") to predict the state ("ONE" or "ZERO") of the current bit cell. The problem is to decide whether the duration between flux reversals is short enough to be a "ONE", or long enough to be "ZERO". The problem is compounded when the presence of jitter and acceleration modify the durations between adjacent flux reversals.

Since jitter is of a random nature, and often fairly significant in magnitude (+/−10% is common), it becomes virtually meaningless to try to calculate acceleration and take it into account in determining a decision point. Because of this, the decision point used in the circuit ignores the quantitative effects of acceleration. However, the qualitative effects of acceleration and jitter can be used to make worst case decisions. The result of this is a simplification of the calculation for the decision point, because only the duration of the most recent bit frame need be used.

The problem can be portrayed by considering a successfully decoded bit cell (Tn−1) followed by a flux reversal spacing (Tn) whose duration is shorter by some unspecified amount.

A decoding circuit must decode if the duration Tn is a "ZERO" that appears short because of acceleration and jitter, or if the duration is a "ONE" that appears long for the same reasons. Some decision point is needed, which is some fraction of Tn−1; such that, if Tn is short of the point, a "ONE" transition has occurred and if Tn is longer than the point, a "ZERO" transition has occurred. Because there is no way of knowing the actual velocity of a card, the ratio of the durations (R) is the important parameter.

$$R = \frac{Tn}{Tn-1}$$

If R=1 then it is assumed that a "ZERO" has been detected. If R=½, then it is assumed that a the first half of a "ONE" has been detected. However, if R falls somewhere between these two points then the question arises as to the value of R at which a "ZERO" becomes indistinguishable from a "ONE"? This happens at the two worst cases: (i) A short "ZERO" that follows a long bit cell, causing the "ZERO" to appear as a "ONE". (ii) A long "ONE" that follows a short bit cell, causing the "ONE" to appear as a "ZERO".

For case (i), $Tn = T(1-j)$ (length of short "ZERO")

$Tn-1 = T(1+j)$ (previous cell length)

The duration T is of nominal bit cell at the current card speed, and j is the amount of jitter (expressed as a fraction). In this case the ratio becomes:

$$Ri = \frac{(1-j)}{(1+j)}$$

For the case (ii):

$Tn = T/2(1+j)$ (first transition of long "ONE")

$Tn-1 = T(1-j)$ (previous cell length)

So, the ratio becomes:

$$Rii = \frac{(1+j)}{2(1-j)}$$

As long as Rii is less than Ri, then successful decoding is possible. Decoding becomes impossible when Ri=Rii. The value of j at which this happens is determined by setting Ri=Rii and solving for j.

$$\frac{(1-j)}{(1+j)} = \frac{(1+j)}{2(1-j)}$$

$$2(1-j)^2 = (1+j)^2$$

$$2(1-2j+j^2) = 1+2j+j^2$$

$$2-4j+2j^2 = 1+2j+j^2$$

$$j^2 - 6j + 1 = 0$$

The meaningful root is:

$$j = 3 + \sqrt{8}$$
$$= 0.172 \text{ or } 17.2 \text{ percent}$$

So, data with a maximum of 17% jitter can be decoded in the absence of acceleration (or a combination of acceleration and jitter that causes a cumulative effect of this magnitude) the decision point is then found by solving for either R above.

$$R = \frac{1-(3-\sqrt{8})}{1+(3-\sqrt{8})} = .707$$

This is the theoretical decision point for decoding flux spacings into "ZEROs" and "ONEs" in the absence of acceleration. The qualitative results of acceleration modify the above results slightly for practical considerations.

Acceleration is basically a measure of how fast speed will change with time. The greater the time under consideration, the greater the speed change within that time. This means that acceleration will have its greatest effect at very low speeds. At low speeds, the amount of time for a bit cell to pass the gap of a read head is greatest, as is the change of speed from one bit cell to the next. At high speeds, very little speed change occurs from one bit cell to the next, even at high accelerations.

Acceleration can be either positive or negative, that is, speeding up or slowing down. Positive acceleration causes a bit cell to appear shorter in duration than the one before it (since the magnetic media is moving faster).

Positive acceleration is the most frequent to occur. Deceleration may occur when the card first comes into contact with the read head, but the deceleration will be over by the time the head has passed out of the leading "ZEROs" and into the data on the card. The result is that the decision point ca be modified to optimize for positive acceleration. If the decision point is made to occur slightly early, the greater the success in decoding positive acceleration at low speeds.

This result simplifies the electronic circuit. A circuit that divides a bit cell by 7/10 is simpler than a circuit that must divide by 7.07/10. A decision point that is 7/10 of the previous bit cell duration has been implemented in the decoding logic circuit 50 and has been found to perform quite satisfactorily.

What is claimed is:

1. A decoder for flux reversal indicia on a magnetic material, said decoder including circuit means responsive to each of said indicia for generating a signal representative thereof, said circuit means including an amplitude differentiator for disabling said circuit responsive to flux reversal indicia on said magnetic material which produce signals which have amplitudes of less than a preset amplitude which is a function of the signal being read, wherein said magnetic material is a magnetic stripe having a sequence of indicia recorded thereon at a density of from about 65 bits per inch to about 430 bits per inch, said indicia comprising positive and negative flux reversals, said decoder also including means responsive to successive indicia pairs of said sequence of said indicia for determining the distance to the next successive flux reversal of opposite polarity, and means for setting positive and negative pulse amplitude threshold levels for discriminating against positive and negative low amplitude pulse levels respectively.

2. A decoder as set forth in claim 1 wherein the boundaries of a data cell are defined by a pair of poled magnetic flux reversals, a binary one and a binary zero being represented by the presence and absence of a magnetic flux reversal in a cell, said decoder including means for determining the period of each of said cells, said means being responsive to the occurrence of a magnetic flux reversal representative of a trailing boundary of a first cell for establishing a decision point for the determination of the binary value of a next succeeding cell ba on the last cell period.

3. A decoder as set forth in claim 2 wherein said decision point is set at about 0.707 of the period of said next succeeding cell.

4. A decoder as set forth in claim 3 wherein said decision point is set at 7/10 ths. of the period of said next succeeding cell.

* * * * *